United States Patent [19]
Jägers

[11] 4,102,231
[45] Jul. 25, 1978

[54] CIRCULAR SAW BLADES

[76] Inventor: Leopold Jägers, Rudolf-Diesel-Strasse 1, D-5350 Euskirchen, Germany

[21] Appl. No.: 769,713

[22] Filed: Feb. 17, 1977

[30] Foreign Application Priority Data

Feb. 19, 1976 [DE] Fed. Rep. of Germany ....... 2606598

[51] Int. Cl.² .............................................. B23D 61/02
[52] U.S. Cl. .......................................... 83/854; 83/839
[58] Field of Search ................. 83/835, 837, 838, 839, 83/854, 676, 661

[56] References Cited

U.S. PATENT DOCUMENTS

| 1,676,071 | 7/1928 | Bolinder | 83/854 |
| 2,531,841 | 11/1950 | Cashin | 83/835 X |

Primary Examiner—Willie G. Abercrombie

[57] ABSTRACT

Circular saw blades for sawing cold steel and the like, wherein the region of each tooth is provided on both sides with a plurality of lateral cutting edges, preferably from two to ten such edges.

6 Claims, 9 Drawing Figures

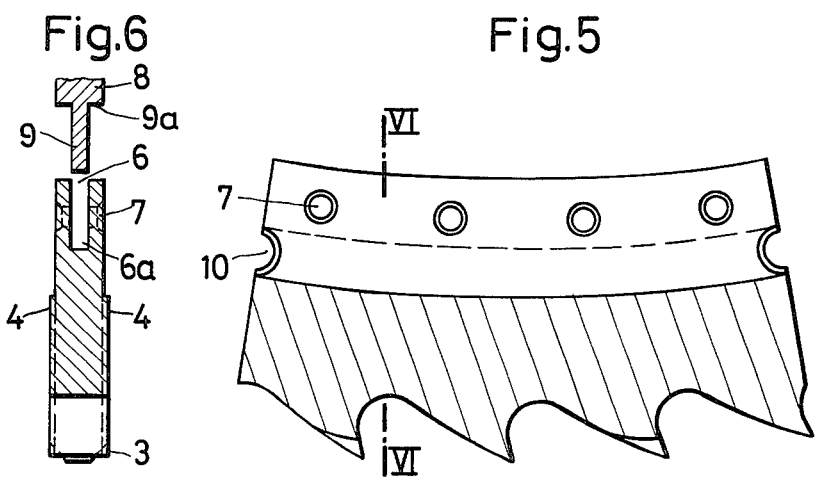
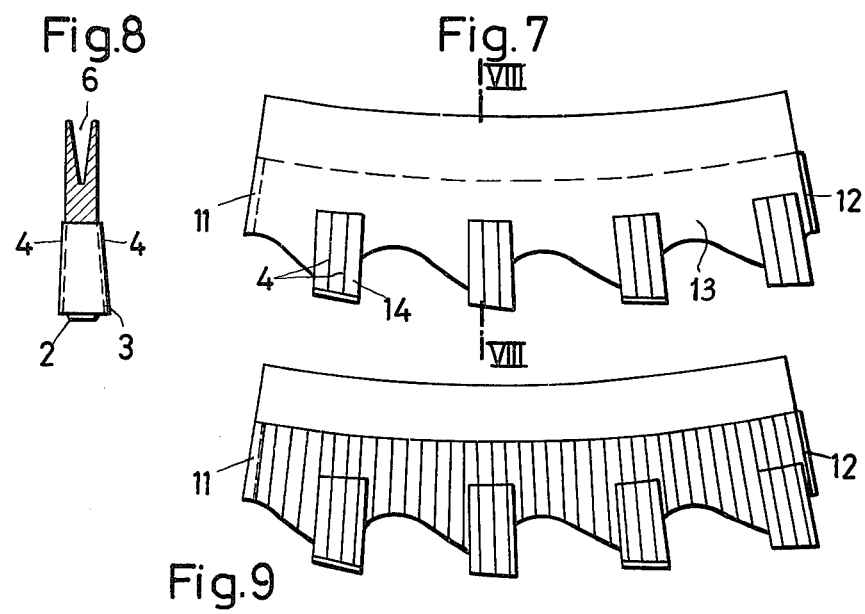

12# CIRCULAR SAW BLADES

FIELD OF THE INVENTION

The invention relates to saw blades for sawing cold steel or the like, that is to say blades whose teeth move during sawing at a speed of the order of 5 to 150 meters per minute, particularly circular saw blades whose peripheral speed is of the mentioned order of magnitude.

PRIOR ART

Circular saw blades of this kind are known which are made of a heavy-duty high-speed steel and whose teeth are worked from a blade of this kind. In addition, circular saw blades of this type are known in which segments of heavy-duty high-speed steel are riveted or adhesively bonded to a main blade portion of tough-hard tool steel, the teeth being formed from the segments, while circular saw blades are also known which are made of tough-hard tool steel on which teeth of hard metal are attached.

Because of the internal stresses of steel plates worked by means of saws of this kind, these blades may be laterally jammed with such great forces that cold welding occurs between the steel plate and the blade. This cold welding usually leads to the destruction of the saw blades.

In order to counteract this difficulty the flank of the teeth have been ground conical, that is to say with a cone angle of from a few tenths of a degree up to 1.5°, relative to the axis of the saw blade. In addition, the individual teeth have been backed off. It has however been found that these measures are not sufficient to enable the cold welding of the tooth flanks to the material of the workpiece to be reliably avoided when the rate of feed is high.

SUMMARY OF THE INVENTION

An object of the invention is to construct saw blades which avoid jamming of the teeth of the saw blade by forces which impair reliable sawing, and in particular by which cold welding is prevented.

According to important features of the invention, this problem is solved in that the saw blade is provided, in the region of each tooth on both sides, with a plurality of lateral cutting edges of which there are preferably from two to 10.

The cutting edges preferably lie at an acute angle of about 60° to 90° relative to the cutting direction. Blades of this kind have the additional advantage that their thickness can be considerably reduced, so that the loss of workpiece material and expenditure of energy during sawing is correspondingly substantially reduced and the life of the saw blade is substantially lengthened. In order to prevent the deflection of such thin saw blades, they are preferably guided by means of jaws.

The lateral cutting edges are preferably undercut at an angle of about 7° to 15°. Taking into account the undercut angle, the number of cutting edges is so great that the height of the cutting edge flanks is not greater than from 0.1 to 2mm, or 10% of the thickness of the saw blade.

In the case of teeth having conical tooth flanks it is expedient for the height of the cutting flanks of the lateral cutting edges not to be made greater than the difference in saw blade thickness between the thickest and the thinnest parts of its conical portion.

The lateral cutting edges are preferably briefly interrupted over their length at at least one point, so that a chip removed by a cutting edge of this kind is divided and its discharge is thereby facilitated.

The thickness of a saw blade of this kind may be less than 1% of the diameter of the blade, or less than 0.9% of the diameter in the case of blades whose diameters are greater than 0.5 meters. In many cases it is expedient to reduce the thickness of the saw blade to about 0.6% of its diamter.

In the case of circular saw blades in which the teeth are parts of segments fastened on a main blade portion by means of tongues and grooves which are components of the segments of the main blade, according to a further development of the principle of the invention, the surfaces of the tongues and grooves corresponding to one another may be made conical in relation to the axis of the saw blade in such a manner that the thickness of the tongues and the width of the grooves decrease with their distance from the axis of the saw blade. This permits a further reduction of the thickness of the blade.

DESCRIPTION OF THE DRAWINGS

The invention will be better understood in its various aspects by reference to the following description, when considered with the accompanying drawings, wherein

FIG. 5 is a side view of a segment which is to be fastened on the main blade portion by means of rivets, various segments of circular saw blades according to the invention being shown in FIGS. 5 to 9;

FIG. 6 is a section on the line VI — VI in FIG. 5;

FIG. 7 is a side view of a segment which is to be adhesively bonded or soldered to the main blade;

FIG. 8 is a section on the line VIII — VIII in FIG. 7;

FIG. 9 is a side view of an alternative to the segment blade shown in FIG. 7;

DETAILED DESCRIPTION

Figure 1:
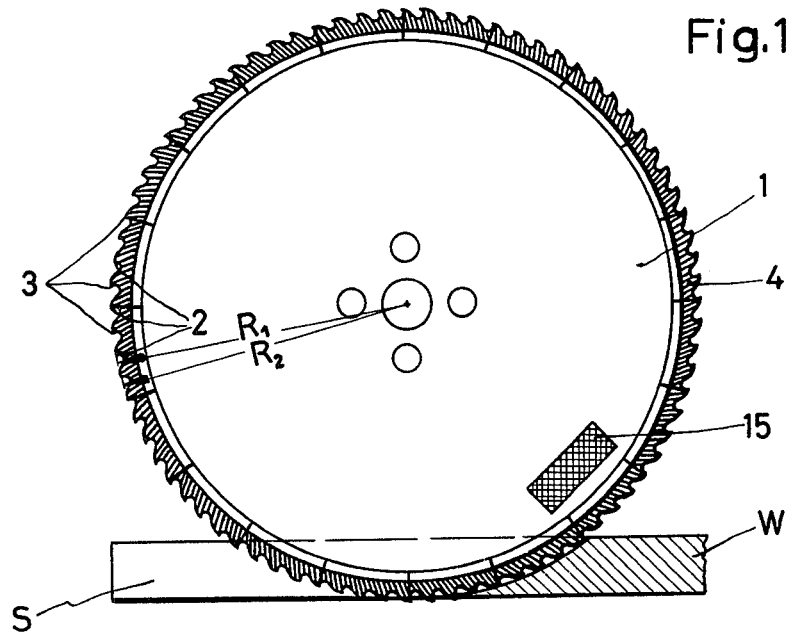
FIG. 1 is a side view, partly in section, of a circular saw blade according to the invention, with part of a workpiece.
Figure 2:
FIG. 2 is a plan view of the workpiece shown in FIG. 1.
Figure 3:
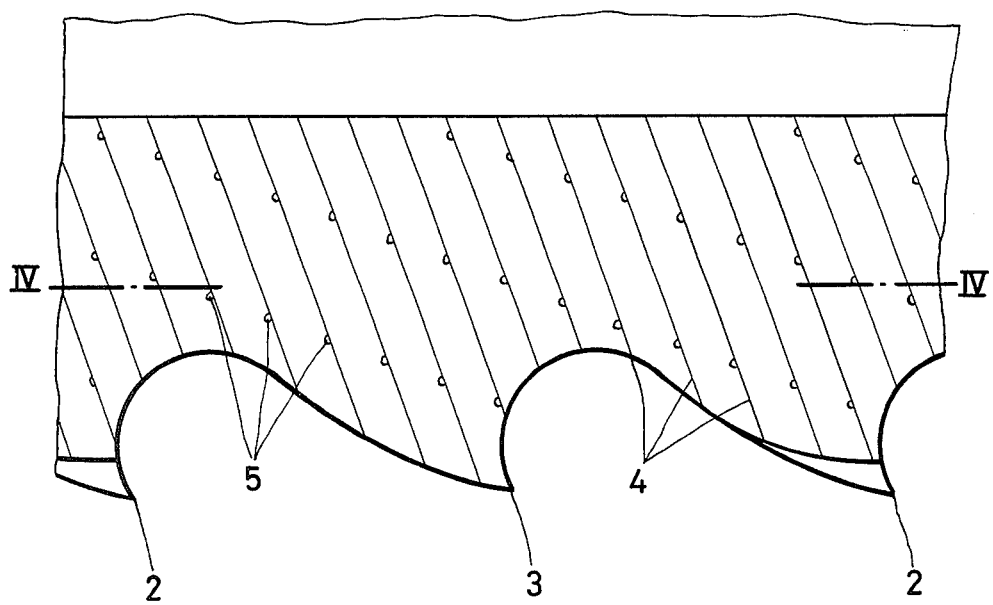
FIG. 3 shows on a larger scale two saw teeth of the blade shown in FIG. 1.
Figure 4:
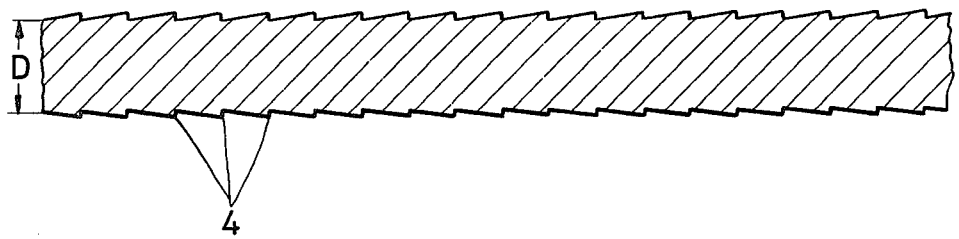
FIG. 4 is a section on the line IV — IV in FIG. 3.

A circular saw blade 1 shown in FIG. 1 has on its periphery leader teeth 2 and follower teeth 3 alternating in a manner known per se. A radius $R_1$ on which front ends of the leader teeth 2 lie is slightly larger, in a known manner, than a radius $R_2$ on which front ends of the follower teeth 3 lie. Over the width of these teeth, provision is made for the regrinding of the saw blade; to this end the edge of the blade 1 is provided on both sides with lateral cutting edges 4 which are parallel to one another and which lie at an angle of 20° to the radial direction. The height of the lateral cutting edges 4 is of the order of from 0.1 to 10% of the thickness D of the blade, so that the angle of the undercut of the lateral cutting edges 4 is of the order of magnitude of about 10°.

Since the side flanks of a circular saw blade of this kind are not flat and parallel to one another, there is no danger of a cold welding of the material of the blade 1 to that of the workpiece W, which may otherwise occur if, as a result of forces K which may occur during the sawing of the workpiece, having considerable internal stresses, the saw blade is jammed in a gap S formed by it in the workpiece W (see FIG. 1). Guide jaws 15 prevent the deflection of the saw blade during sawing.

The lateral cutting edges 4 are interrupted in their length at points 5. The length and depth of the gap may be less than 1mm but may also be greater.

FIGS. 5 and 6 show a segment, having on its inner edge a groove 6 and a number of holes 7 for rivets which can be placed transverselly through a groove 6. A main saw blade 8 is provided with a tongue 9 corresponding to the groove 6. After the grooves 6 of the segments have been placed on the tongue 9 of the main blade 8 in such a manner as to be in contact with one another in the peripheral direction, they are fastened on the main blade portion by the rivets. In order to be able to adjust the segments more easily in relation to the main blade, semi-circular holes 10 are provided at the ends of the segments for corresponding adjusting pins.

A segment shown in FIG. 7 differs from the segment shown in FIG. 5 in that teeth 14 of hard metal are inserted in a manner known per se into a segment body 13 consisting of tough-hard tool steel. In their two flanks lying opposite one another the hardmetal teeth 14 have the lateral cutting edges 4 of the kind described above. These lateral cutting edges 4 lie in directions substantially coinciding with the radii of the saw blade.

For the purpose of joining together the ends of the segments, the latter are provided with grooves 11 and tongues 12. This arrangement also permits conical grinding of the side cheeks of the segments. The method of fastening toothed segments on the main blades of circular saws described above is known in itself. Since the possible fracture points of this connection are situated at the root 9a of the tongue 9 and at the base of the groove 6 (see FIG. 6), it is advisable to give them a conical form.

FIG. 8 shows such a conical groove 6' at the segment; the corresponding tongue has to have a respective conical form.

The segment shown in FIG. 9 differs from that shown in FIG. 7 in that it is made of heavy-duty high-speed steel, and that not only the hard-metal teeth 13 but also the edge portions of the segments in which the latter are inserted are provided with lateral cutting edges of the kind described above.

It will be understood by those skilled in the art that several modifications, additions, changes and variations can be incorporated in the inventive saw blade without departing from the spirit and scope of the present invention.

What I claim is:

1. A circular saw blade for sawing cold steel and the like, comprising a main blade portion (1, 8) with a number of leader teeth (2) and follower teeth (3) alternating on its periphery, wherein in the region of each of said teeth said blade portion is provided on both lateral surfaces with at least two lateral cutting edges (4), said cutting edges extending from said teeth radially inwards.

2. The saw blade as defined in claim 1, wherein said cutting edges (4) lie at an angle of about 60° to 90° relative to the cutting direction of the blade.

3. The saw blade as defined in claim 1, wherein said cutting edges (4) are undercut at an angle of about 7° to 15° and, taking into account the undercut angle, the number of said cutting edges is so great that the height of the flanks of said cutting edges is less than 0.1 to 2mm of the thickness of said blade portion (1, 8).

4. The saw blade as defined in claim 3, wherein the height of the flanks of said cutting edges is less than 10% of the thickness of said blade portion (1, 8).

5. The saw blade as defined in claim 3, wherein said teeth (2, 3) have conical flanks and the height of the cutting flanks of said cutting edges (4) is less than the differences in thickness of said blade portion (1, 8) between the thickest and thinnest parts of its conical portion.

6. The saw blade as defined in claim 1, wherein said cutting edges (4) are briefly interrupted at at least one point along their lengths.

* * * * *